United States Patent [19]
Srinivasan et al.

[11] Patent Number: 5,852,822
[45] Date of Patent: Dec. 22, 1998

[54] INDEX-ONLY TABLES WITH NESTED GROUP KEYS

[75] Inventors: Jagannathan Srinivasan, Nashua; Samuel DeFazio, Hollis; Jayanta Banerjee, Nashua; Chuck Freiwald, Milford; Souripriya Das, Nashua, all of N.H.

[73] Assignee: Oracle Corporation, Redwood Shores, Calif.

[21] Appl. No.: 764,112

[22] Filed: Dec. 9, 1996

[51] Int. Cl.$^6$ ........................................ G06F 17/00
[52] U.S. Cl. ........................ 707/4; 707/3; 707/6; 707/201
[58] Field of Search .................... 707/1–10, 201, 707/522, 532, 526; 382/230

[56] References Cited

U.S. PATENT DOCUMENTS

| | | | |
|---|---|---|---|
| 5,404,514 | 4/1995 | Kageneck et al. | 707/5 |
| 5,551,027 | 8/1996 | Choy et al. | 707/201 |
| 5,619,709 | 4/1997 | Caid et al. | 707/532 |
| 5,623,679 | 4/1997 | Rivette et al. | 707/526 |
| 5,623,681 | 4/1997 | Rivette et al. | 707/522 |
| 5,706,365 | 1/1998 | Rangarajan et al. | 382/230 |

*Primary Examiner*—Thomas G. Black
*Assistant Examiner*—David Yiuk Jung
*Attorney, Agent, or Firm*—McDermott, Will & Emery

[57] ABSTRACT

A method and apparatus for building, maintaining, and using a multi-level index is provided. The multi-level index is accessed using a key. The key is divided into multiple portions referred to as sub-keys. The first level of the multi-level index is built on a first-level sub-key. Each index entry at the first-level is for a particular first-level sub-key value, and either includes sub-entries associated with second-level sub-key values or a reference to a second-level data retrieval structure. All second-level data retrieval structures are built on the portion of the key that has been designated as the second-level sub-key. As the vocabulary of the first-level sub-key becomes exhausted, fewer maintenance operations will have to be performed to maintain the first-level data retrieval structure. This decreases the overhead and increases the concurrency in a database system that uses the multiple-level index. The multi-level index structure is especially suited for queries that retrieve all values for a given first-level sub-key. The structure also has reduced storage costs compared to a single-level index structure, since first-level sub-key values are stored only once for each nested group.

20 Claims, 7 Drawing Sheets

INDEX-ONLY TABLES WITH NESTED GROUP KEYS

FIELD OF THE INVENTION

The present invention relates to database systems, and more particularly, to index structures used for accessing data stored in database systems.

BACKGROUND OF THE INVENTION

Many information retrieval applications make use of inverted indexes when performing content-based searches on text document collections. Typically, such inverted indexes are implemented using a table and a B-tree index.

Each row in the table has the form <word, doc_oid, occurrence-data>, where "doc_oid" is an identifier for a document in the document collection, "word" is a word that exists in the document identified by the doc_oid, and "occurrence-data" is data that indicates the number of times the word appears in the specified document and the locations of the word within the specified document. For example, the row <happy, X, 3, "5 8 21"> indicates that the word "happy" appears three times in document X, at locations 5, 8 and 21.

To speed up retrieval of data from a table used to implement the inverted index, a B-tree index is typically built on the <word, doc_oid> columns of the table. Thus, each index entry in the B-tree has the form <[word, doc_oid], rowid>, where rowid uniquely identifies the row within the table that corresponds to the index entry. For example, assuming that the row given above is row 10 of the table, the index entry for the row would be <[happy, X], 10>.

The conventional "table plus B-tree" approach to implementing an inverted index has numerous drawbacks. For example, there is a large degree of duplication between the data stored in the index and the data stored in the table. Specifically, every <word, doc_oid> value is stored in both the table and the index. In the example given above, the value [happy, X] is stored in both the table and the B-tree index. This redundancy can be an expensive waste of storage since the inverted index for a large set of documents can be huge.

Another disadvantage with conventional inverted indexes is that an enormous amount of overhead may be required to support incremental updates to the inverted index. Specifically, when a document is dynamically added or deleted from the collection associated with the inverted index, a large number of entries must be added to or deleted from both the B-tree index and the table. The addition or deletion of index entries in the B-tree may result in splitting and merging of B-tree nodes. Such operations may be very expensive, since the splits or merges may go all the way to the root of a massive B-tree.

Yet another disadvantage of the conventional implementation of inverted indexes is amount of overhead required for the retrieval of all entries for a given word. This type of request is common in information retrieval environments. To handle a request for all entries for a given word, the B-tree index must be accessed to get each index entry for the specified word. The rowids within each such index entry is then used to retrieve the corresponding row from the table. It would be more efficient if the data is available in the B-tree index leaf nodes.

Based on the foregoing, it is clearly desirable to provide a structure for implementing an inverted index that does not involve as much duplication of data as conventional implementations. It is further desirable to provide an indexing mechanism where the balance can be maintained with less overhead than that required to maintain conventional inverted indexes. It is further desirable to provide a more efficient technique for extracting information from inverted indexes.

SUMMARY OF THE INVENTION

A method and apparatus for constructing and using a multiple-level index are provided. According to the method, the key to the index is divided into two or more sub-keys. A first-level data retrieval structure, such as a B-tree or hash table, is built on a first-level sub-key of the two or more sub-keys.

Each index entry in the first-level data retrieval structure is for a particular first-level sub-key value. According to one aspect of the invention, each index entry in the first-level data retrieval structure includes either a set of sub-entries, or a reference to a second-level data retrieval structure that is built on a second-level sub-key.

Specifically, sub-entries for a particular first-level sub-key value are stored in the index entry for that first-level sub-key value until the space occupied by the set of sub-entries exceeds a predetermined threshold. When the threshold is exceeded, the sub-entries are removed from the index entry in the first-level data retrieval structure and stored in a second-level data retrieval structure that is built on the second-level sub-key.

According to another aspect of the invention, each sub-entry for a given first-level sub-key value includes a second-level sub-key value and data from all of the non-key columns that correspond to the particular first-level sub-key/second-level sub-key combination. Because the actual data from the non-key columns is stored within the index structure itself, the index does not have to be used in combination with a table. Consequently, values that constitute the key to the index do not have to be stored redundantly, and use of the index does not require the additional step of retrieving information stored in a table associated with the index.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for implementing inverted indexes using an index-only table with nested group keys is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
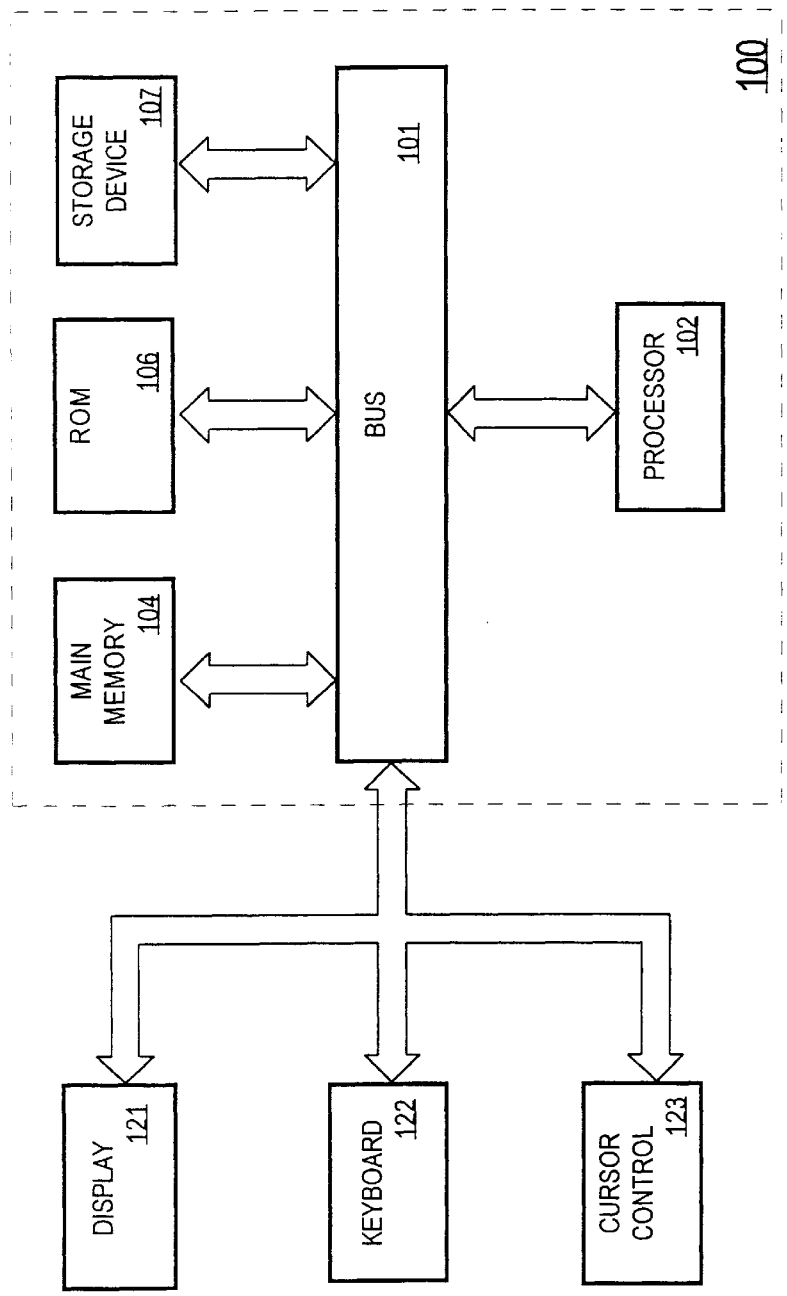
FIG. 1 is a block diagram of a computer system that may be used to implement embodiments of the present invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to build, maintain and use index-only table with nested group keys. According to one embodiment, these operations are performed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

INDEX-ONLY TABLES

According to one embodiment of the invention, an inverted index is implemented using an index-only table. An index-only table is similar to a conventional table with an index on one or more of its columns. Users may access and manipulate index-only tables using the same operations that can be performed on conventional tables. However, an index-only table differs from a standard table in that instead of maintaining two separate data structures (i.e. a table and an index), the database server only maintains an index with no actual table.

Each entry in an index-only table contains both the encoded key value and the associated column values for the corresponding row. That is, rather than having row ROWID as the second element of the index entry, the actual data from the corresponding row is stored in the index. Thus, every index entry for an index-only table has the form <primary_key_value, non_primary_key_column_values>.

As mentioned above, conventional inverted index implementations store the values in the primary key columns in both an index and in a corresponding table. In contrast, values from the key columns are stored only in the index of an index-only table. There is no corresponding table. Consequently, the use of index-only tables to implement inverted indexes avoids the storage waste associated with the data duplication involved with conventional inverted index implementations.

In addition, the use of index-only tables reduces the number of steps required to use an inverted index. Specifically, an index-only table may be traversed to identify the index entries associated with a particular key value. However, rowids within the index entries are not used to retrieve rows from a table. Rather, the index entries themselves contain all of the information that conventionally would have been stored in the table. Therefore, the extra step of retrieving rows from a table is avoided.

USING INDEX-ONLY TABLES

As with conventional tables, clients manipulate index-only tables by submitting statements to the database server in the database language supported by the database server. However, all operations on the data in the table are performed by manipulating the corresponding index.

According to an embodiment of the invention, the same database commands used to build and access a conventional table and index are used to build and access index-only tables. For example, an index-only table can be created to model an inverted index for an information retrieval client in the following manner:

```
CREATE TABLE docindex
(   token char(20),
    doc_oid integer,
    token_frequency smallint,
```

```
    token_occurrence_data varchar(512),
      CONSTRAINT pk_docindex PRIMARY KEY (token, doc_oid))
ORGANIZATION INDEX AREA text_collection
PCTTHRESHOLD 20
OVERFLOW AREA text_collection_overflow;
```

In the above definition, the ORGANIZATION INDEX qualifier indicates that docindex is an index-only table, where the row data reside in an index defined on columns that designate the primary key (token, doc_id) for the index-only table. The overflow clause indicates that pieces of data rows which exceed 20% of the block size will be placed in the text_collection_overflow area.

No syntax changes are required to manipulate index-only tables. A user can use an index-only table in place of a regular table in SQL INSERT, SELECT, DELETE, and UPDATE statements. However, for index-only tables the rows are stored in the B-tree itself and these rows are identified by the primary key instead of their physical location. Users access the rows of index-only tables using the primary key.

ROW OVERFLOW

For index-only tables, index entries can become very large, since they are made up of <key, non_key_column_values> tuples. If index entries get very large, then the leaf nodes may have to store one row or row-piece, thereby destroying the dense clustering property of the index.

To overcome this problem, a Row Overflow Area clause may be used. Specifically, users specify an overflow area as well as a threshold value. The threshold is specified as a percentage of the block size. If the row size is greater than the specified threshold value, then the non-key column values for the row that exceeds the threshold are stored in the specified overflow area. When this occurs, the index entry contains <key, rowhead> pair, where the rowhead contains the beginning portion of the rest of the columns. The rowhead is like a regular row-piece, except that an overflow row-piece contains the remaining column values.

EXEMPLARY INDEX-ONLY TABLE

Figure 2:
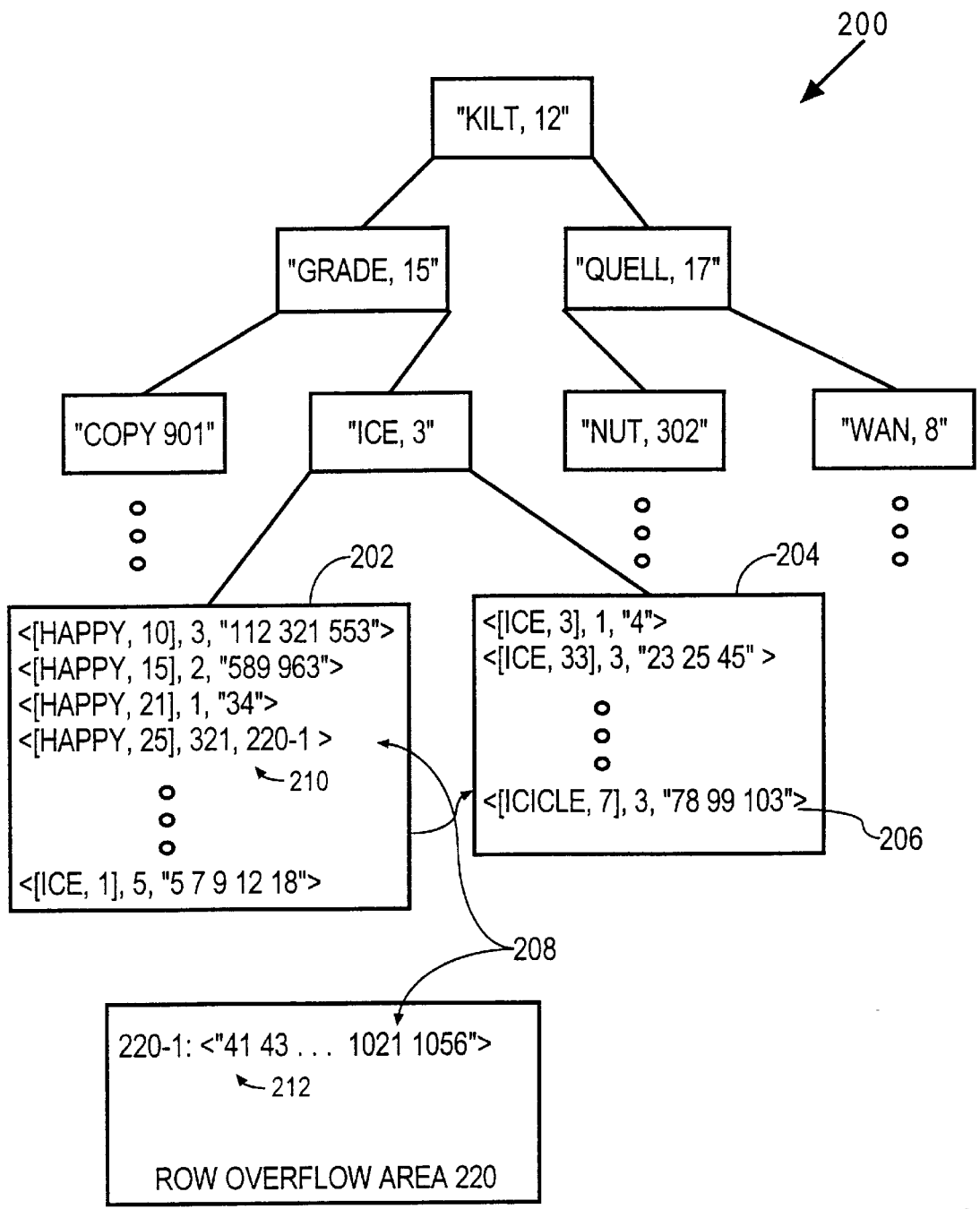
FIG. 2 is a block diagram of an index-only table with a row overflow area according to an embodiment of the invention.

FIG. 2 is a block diagram that illustrates an index-only table 200 according to an embodiment of the invention. As with conventional B-tree indexes, index-only table 200 includes branch nodes and leaf nodes. Each branch node stores one or more values that indicate which value ranges correspond to the nodes beneath the branch node. Each leaf node stores entries for a particular range of key values. In the illustrated embodiment, a leaf node 202 includes index entries associated with the key values "happy 10", "happy 15", "happy 21", "happy 25" and "ice 1". Another leaf node 204 includes index entries associated with the key values "ice, 3", "ice, 33" and "icicle, 7".

Index-only table 200 is not associated with any actual table. Rather, the index entries in the leaf nodes of index-only table 200 contain all of the non-key values that would conventionally be stored in a separate table. For example, index entry 206 not only contains the value "icicle, 7" for the primary key <word, doc_oid> used to build the index, but also contains all of the values "3, 78, 99, 103" for the non-key column values <frequency, occurrence-list> that correspond to the primary key value in the index entry.

A row overflow area 220 has been established for index-only table 200. The leaf node 202 does not have enough space to store all of the values for an index entry 208. Therefore, the rowhead 210 of index entry 208 is stored within leaf node 202, while the rowtail 212 of index entry 208 is stored within row overflow area 220. Note that the rowhead 210 contains the address 220-1 of rowtail 212.

B-TREE SPLIT AND MERGE OPERATIONS

The leaf nodes of an index have limited space available for storing index entries. If an insert attempts to add an entry that exceeds the free space available in an index leaf node, approximately half of the leaf node entries are moved to a new (empty) index leaf node. This operation is typically known as the splitting of a leaf node. Similarly, as more space within a leaf node gets freed due to deletions, it is possible to merge a series (typically a pair) of neighboring leaf nodes and create a single leaf node. Such splits and merges cause the corresponding branch nodes to split and merge, and these operations can potentially propagate to the root of the B-tree. Thus, mere and split operations can consume large amounts of time and processing power as the B-tree gets large.

NESTED DATA RETRIEVAL STRUCTURES

A nested data retrieval structure is a data retrieval structure (e.g. hash table, B-tree, linear list) that serves as a component of a larger data retrieval structure. A nested data retrieval structure may itself contain a nested data retrieval structure. For the purposes of explanation, a data retrieval structure that is not nested within another structure shall be referred to as a first-level data retrieval structure. A data retrieval structure that is nested within a first-level data retrieval structure shall be referred to as a second-level data retrieval structure. A data retrieval structure that is nested within a second-level data retrieval structure shall be referred to as a third-level data retrieval structure, etc.

To reduce the frequency of and overhead associated with split and merge operations on index-only tables, an inverted index is implemented using an index-only table that includes nested data retrieval structures according to an embodiment of the invention. The index-only table, which serves as the first-level data retrieval structure, is not built on the entire key (e.g. <word, doc_oid>) that is used to access the data within the inverted index. Rather, the key is divided into two or more portions ("sub-keys"). The first-level tree is only built on the first portion of the key (the "first-level sub-key").

Because the first-level tree is built on the first-level sub-key, each index entry in the first-level tree corresponds to a particular first-level sub-key value. Each index entry in the first-level tree is associated with a group of index sub-entries. Each index sub-entry includes a second-level sub-key value and the values for the non-key columns associated with the particular <first-level sub-key, second-level sub-key> combination. The index entry in the first-level tree for a given first-level sub-key value either contains the group of index sub-entries for the given first-level sub-key value, or a reference to a nested data retrieval structure.

According to one embodiment of the invention, if the group of sub-entries for a given first-level sub-key value is not stored in the index entry for that first-level sub-key value, then the group of sub-entries is stored within a nested data retrieval structure that is referenced by the index entry for that first-level key value. Specifically, if the size of the group of sub-entries for the given first-level sub-key value is less than a predetermined threshold, then the group of sub-entries is stored in the index entry for the first-level sub-key value. On the other hand, if the size of the group of sub-entries exceeds the predetermined threshold value, then the group of sub-entries is stored in a nested data retrieval structure. When the sub-entries for a first-level sub-key are stored in a nested data retrieval structure, only information required to locate to the nested structure is maintained in the first-level B-tree index entry along with the first-level sub-key value. In the nested structure, each index entry will contain the second-level sub-key and the values of the non-key columns.

MAINTAINING LEFT-MOST LEAF NODE POINTERS

Often, queries request all of the occurrence information for a particular word. If a nested tree structure has been created for the sub-entries associated with the word, then the nested tree structure will have to be traversed during the processing of such queries. To avoid the overhead associated with traversing the height of the nested tree, the first level index maintains a pointer to the left-most leaf node of the nested tree.

Specifically, according to one embodiment of the invention, if a nested B-tree is used to store the group of sub-entries for a first-level sub-key value, then a pointer is maintained from the first-level index entry for the first-level sub-key value to the left-most leaf node of the second-level B-tree. Typically, leaf nodes of a B-tree are linked by pointers so that once a starting leaf node is identified, the subsequent leaf nodes can be traversed by following the neighboring leaf node pointers.

All of the entries for a particular first-level sub-key value may be retrieved by following the pointer from the first-level index entry to the leftmost second-level leaf node of the nested tree, and then following the pointers that form the leaf node chain. By avoiding the traversal of the second-level tree, the query processing can be performed more efficiently.

EXEMPLARY TWO-LEVEL INVERTED INDEX

Figure 3:
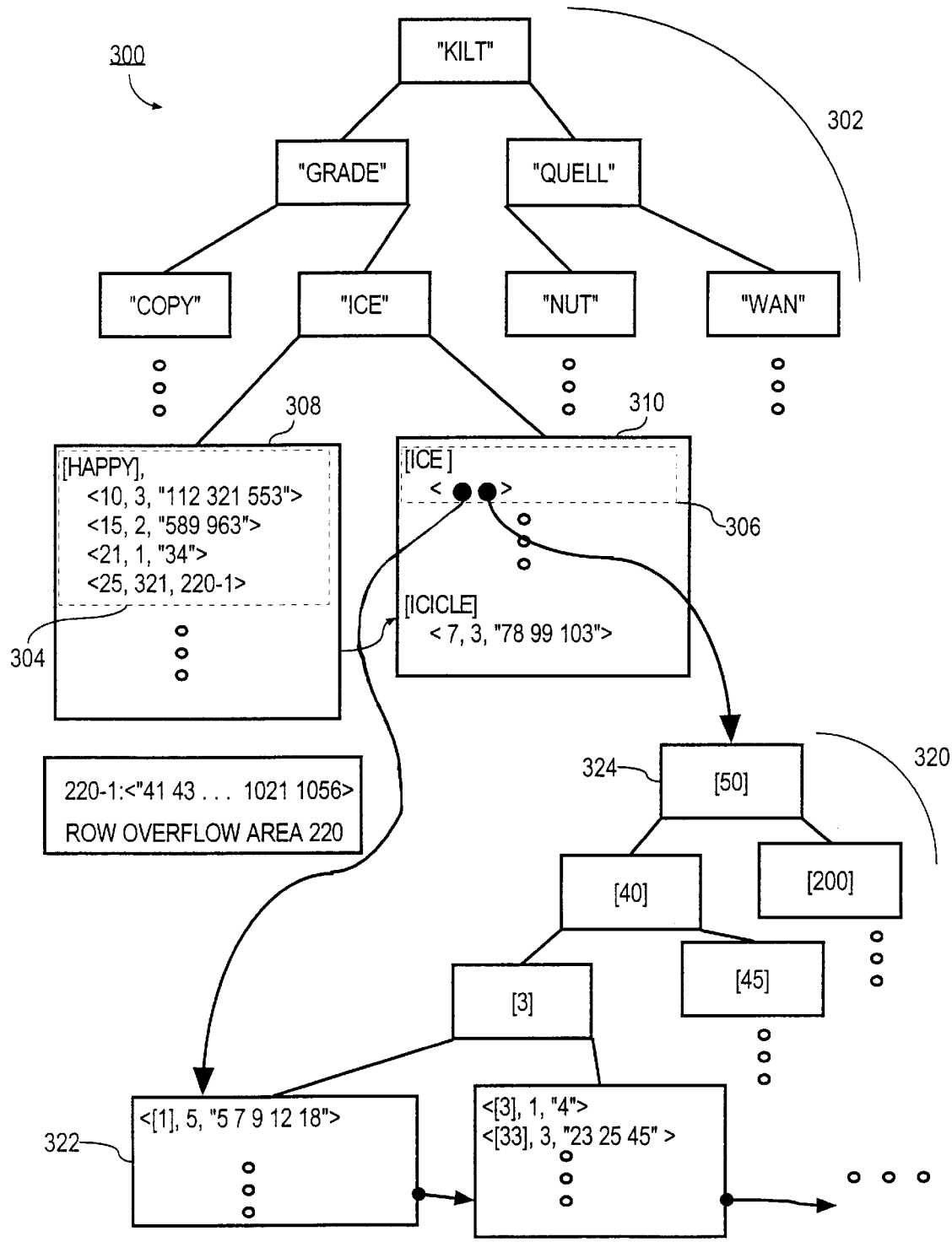
FIG. 3 is a block diagram of a two-level data retrieval structure according to an embodiment of the invention.

FIG. 3 is a block diagram of an inverted index 300 in which the whole key <word, doc_oid> of an inverted index is divided into two sub-keys, <word> and <doc_oid>. The first-level tree 302 of inverted index 300 is built on the first-level sub-key <word>, rather on the entire key <word, doc_oid>.

Each index entry in the leaf nodes 308 and 310 of the first-level tree 302 corresponds to a particular first-level sub-key value. For example, an index entry 304 in leaf node 308 corresponds to the first-level sub-key value "happy", while an index entry 306 in leaf node 310 corresponds to the first-level sub-key value "ice".

Each index entry in the first-level tree 302 is associated with a group of index sub-entries. As mentioned above, if the size of the group of sub-entries for the given first-level sub-key value is less than a predetermined threshold, then the group of sub-entries is stored in the first-level index entry itself along with the first-level sub-key value. In the illustrated embodiment, the number of sub-entries for the first-level sub-key value "happy" is less than the predetermined threshold. Therefore, the sub-entries for the first-level sub-key value "happy" are stored in the index entry 304 within the leaf node 308 of the first-level tree 302.

If the size of the group of sub-entries for a first-level sub-key value exceeds the predetermined threshold value, then the group of sub-entries is stored in a nested structure. In the illustrated embodiment, the number of sub-entries for the first-level sub-key value "ice" exceeds the predetermined threshold. Therefore, the sub-entries for the first-level sub-key value "ice" are stored within a second-level B-tree 320 that is referenced within the first-level tree 302.

As mentioned above, when the sub-entries for a first-level sub-key are stored in a nested structure, only information required to get to the nested structure is maintained in the first-level B-tree index entry along with the first-level sub-key value. Therefore, the index entry 306 for the first-level sub-key value "ice" contains a pointer to the root node 324 of the second-level tree 320 that stores the group of sub-entries for the value "ice". In the leaf node of the second-level tree 320, each index entry contains the second-level sub-key <doc_id> and the non-key columns.

Index entry 306 also contains a pointer to the left-most leaf node 322 of the second-level tree 320. In addition, the leaf nodes of the second-level tree 320 are linked by pointers to form a leaf node chain. Consequently, all of the entries for the first-level sub-key value "ice" may efficiently be retrieved by following the pointer from the first-level index entry 306 in the index entry 306 within the first-level leaf node 310 to the leftmost leaf node 322 of the second-level tree 320, then following the pointers that form the leaf node chain.

REDUCING INDEX MAINTENANCE OVERHEAD

By implementing inverted indexes using the multi-level data retrieval structure described above, the overhead associated with maintaining an index-only table is significantly reduced. Specifically, the first-level tree 302 will grow fast initially, requiring frequent balancing operations. However, such operations will involve little overhead while the first-level tree 302 is yet small.

As the first-level tree 302 grows larger, the vocabulary of the first-level sub-key will approach exhaustion. That is, first-level index entries for virtually all possible first-level sub-key values will have been inserted into the first-level index. Thus, the insertion of new data into inverted index 300 will rarely involve the insertion of new entries into the first-level tree 302. Rather, the insertion of new data will only require the insertion of new sub-entries into existing first-level entries, or the insertion of new sub-entries into a second-level retrieval structure, such as second-level tree 320.

In the exemplary inverted index 300 of FIG. 3, the first-level sub-key values are words from the documents in a document collection associated with inverted index 300. The growth of the first-level tree 302 will slow significantly as the contents of the first-level tree 302 approaches the entire vocabulary of the language in which the documents are written. Once the first-level tree 302 is saturated, the addition of a new document to the document collection associated with the inverted index 300 would involve adding hundreds of sub-entries to existing index entries and/or nested data retrieval structures. However, no new index entries would have to be added to the first-level tree 302.

The sub-entry insertions involve traversing the first-level tree 302 based on the first-level sub-key and adding an entry to the underlying sub-entry group. If the sub-entry group is stored in a nested data retrieval structure, then the sub-entry is added to the nested data retrieval structure. For example, if the nested data retrieval structure is a B-tree, then the nested B-tree is traversed based on the second-level sub-key and the sub-entry is added as a second-level index-entry in the appropriate leaf node of the nested B-tree.

Sub-entry insertions generally do not cause growth of the first-level tree 302. If a hash table is used to store the underlying group of sub-entries, then a hash function is performed on the second-level sub-key to generate a number that indicates where to store the sub-entry within the hash table. If a nested B-tree is used for the underlying group of sub-entries, then the nested B-tree may grow.

The updates on a nested B-tree may result in leaf node splitting and merging. However, any splits and merges performed during index maintenance will be mostly restricted to the particular nested B-tree. Because the nested B-tree is typically a small component of the entire inverted index 300, such maintenance operations involve much less overhead than maintaining a single, one-level index-only table such as index-only table 200 illustrated in FIG. 2.

ENTRY INSERTION PROCESS

Figure 4A:
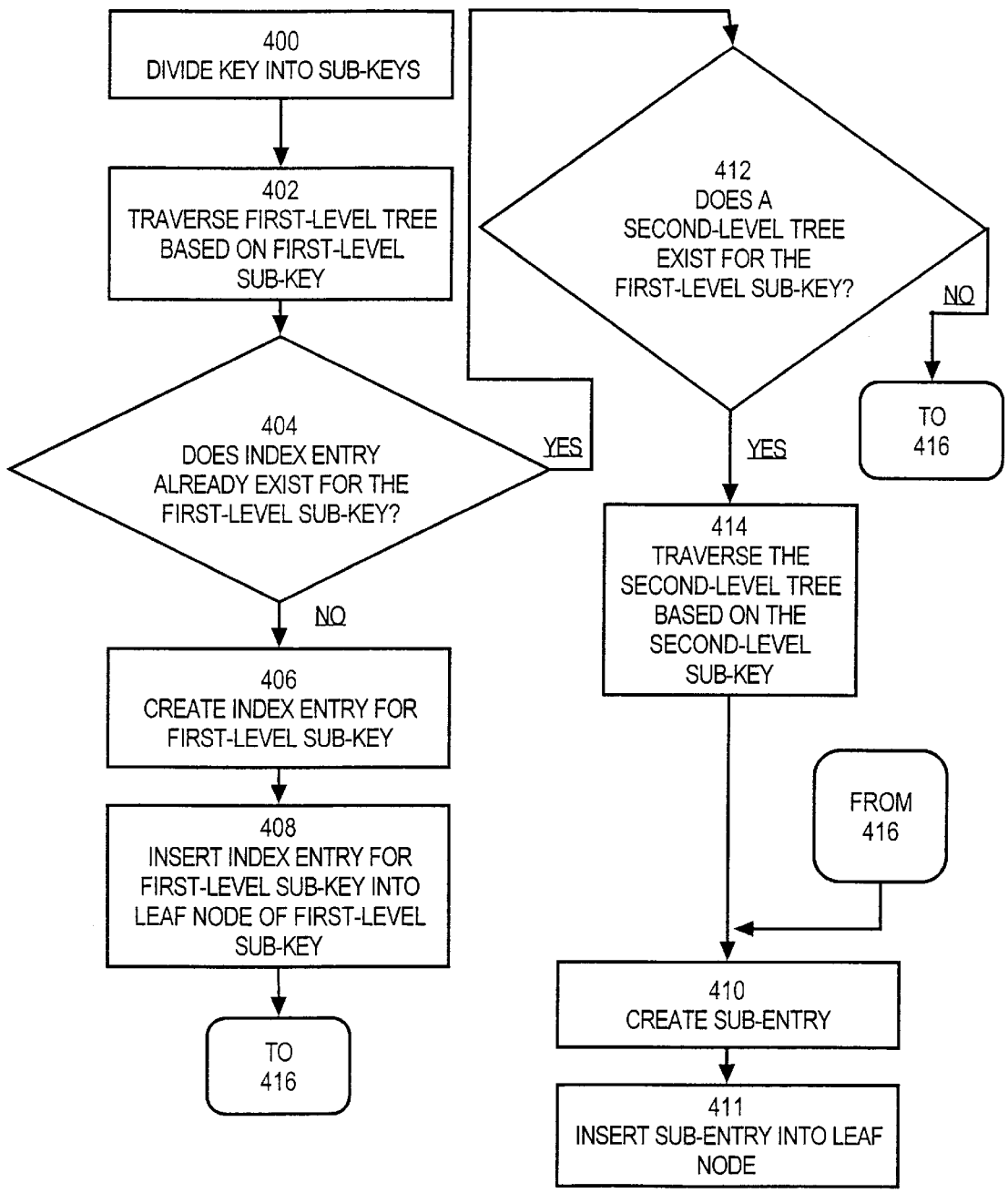
FIG. 4A is a portion of a flow chart that illustrates steps performed to add an index entry to the two-level data retrieval structure shown in FIG. 3.
Figure 4B:
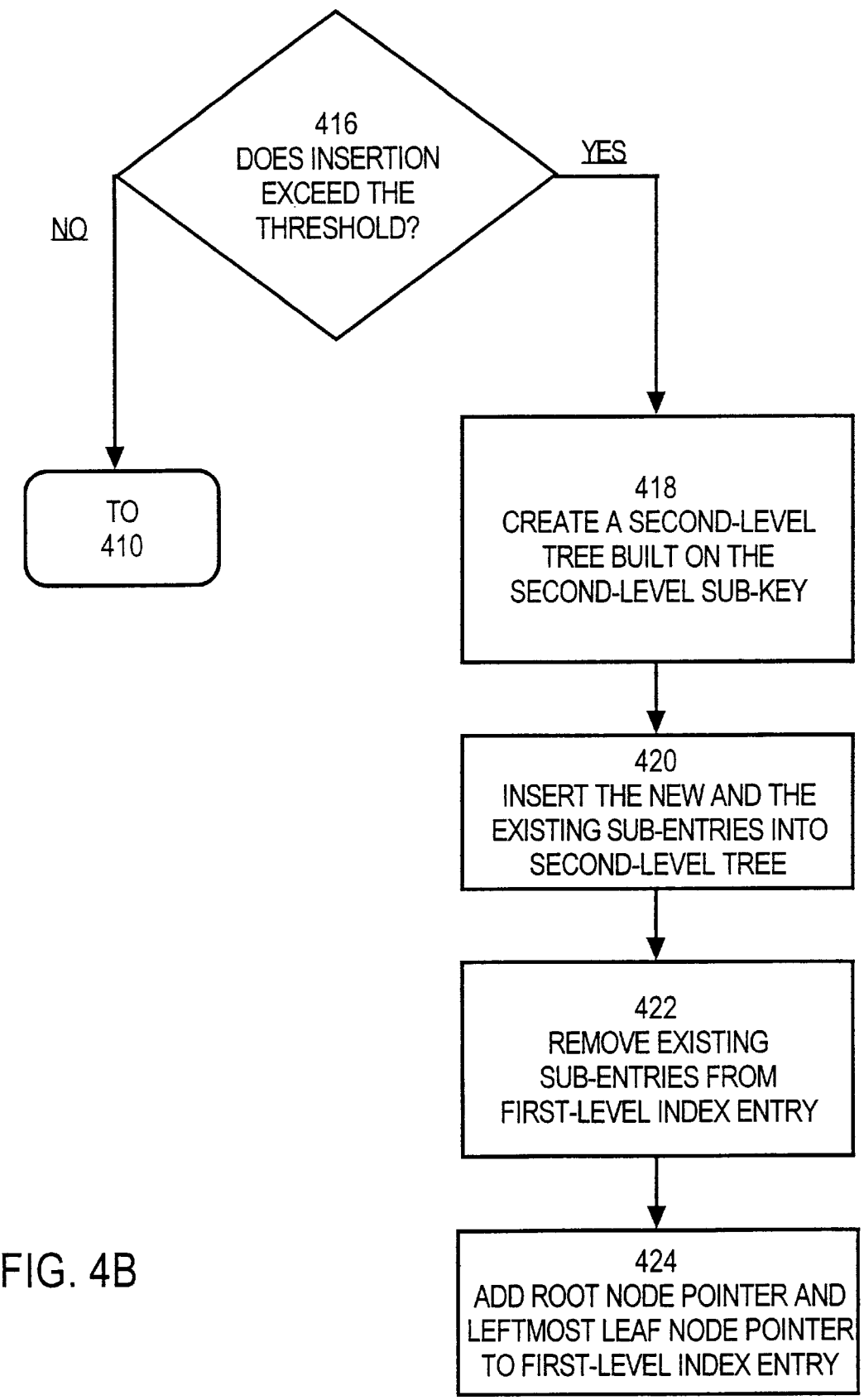
FIG. 4B is another portion of the flow chart that illustrates steps performed to add an index entry to the two-level data retrieval structure shown in FIG. 3.

FIGS. 4A and 4B contain a flow chart that illustrates the process of inserting an entry into an inverted index 300 that is implemented using an index-only table with nested sub-groups according to an embodiment of the invention.

At step 400, the key of the entry to be inserted is divided into sub-keys. For the purposes of explanation, it shall be assumed that the key for the entry to be inserted is <word, doc_oid>, and that the key is divided into the two sub-keys <word> and <doc_oid> at step 400.

At step 402, the first-level tree 302 is traversed based on the first-level sub-key <word>. After performing step 402, the leaf node of the first level tree 302 that corresponds to the range that includes <word> will have been identified.

At step 404, it is determined whether an index entry already exists for the first-level sub-key <word>. If an index entry already exists for the first-level sub-key <word>, then control passes to step 412. For example, if the first-level sub-key is "HAPPY", then control will pass to step 412, since an index entry 304 already exists for the first-level sub-key "HAPPY".

If an index entry does not already exist for the first-level sub-key <word>, then control passes to step 406. For example, if the first-level sub-key is "HAPPINESS", then control will pass to step 406 if leaf node 308 does not contain an index entry for the first-level sub-key "HAPPINESS".

At step 412, it is determined whether a second-level tree exists for the first-level sub-key. If a second-level tree exists for the first-level sub-key, then control passes to step 414. For example, if the first-level sub-key is "ICE", then control would pass to step 414 because a second-level tree 320 has been built for the sub-entries associated with the first-level sub-key "ICE".

If at step 412 a second-level tree does not exist for the first-level sub-key, then control passes to step 416. For example, if the first-level sub-key is "HAPPY", control would pass to step 416 because a second-level tree has not been built for the sub-entries associated with the first-level sub-key "HAPPY". Rather, all of the sub-entries associated with the first-level sub-key "HAPPY" are stored within the entry 304 of leaf node 308 for the word "HAPPY".

At step 416, it is determined whether insertion of an additional sub-entry for the first-level sub-key would exceed a predetermined threshold. For example, assume that any given first-level index entry with the threshold size limitation can hold four sub-entries. The entry 304 for the word "HAPPY" already has four sub-entries. Therefore, the insertion of an additional sub-entry would exceed the predetermined threshold for a given first-level sub-key that may be stored in a leaf node, and control would pass to step 418. On the other hand, if a first-level index entry with the threshold size limitation can hold fifty sub-entries, then the insertion of a fifth sub-entry for the word "HAPPY" would not exceed the predetermined threshold, and control would pass to step 410.

At step 418, a second-level tree is created to store the sub-entries associated with the first-level sub-key. The second-level tree is built on the second-level sub-key stored in the various sub-entries. In the present example, the second-level tree would be built on the <doc_oid> sub-key. At step 420, the new sub-entry and the existing sub-entries associated with the first-level sub-key are added to the second-level tree. For example, if the second-level tree is being built for the first-level sub-key "HAPPY", then the new sub-entry and the four sub-entries stored in entry 304 of leaf node 308 would be inserted into the new second-level tree.

At step 422, existing sub-entries are removed from the first-level index entry. For example, if the second-level tree is being built for the first-level sub-key "HAPPY", then the four sub-entries would be deleted from entry 304 of leaf node 308. At step 424, a root node pointer and a leftmost leaf node pointer are added to the first-level index entry. Thus, if the second-level tree is being built for the first-level sub-key "HAPPY", then a pointer to the root node of the new tree and a pointer to the leftmost leaf node of the new tree would be added to first-level index entry 304.

As mentioned above, if at step 416 the insertion of the sub-entry into the first-level index entry would not exceed the predetermined threshold, then control passes to step 410. At step 410, a sub-entry is created. The sub-entry contains the second-level sub-key and all non-key column values. As mentioned above, the sub-entry may overflow into a row overflow area 220 if the non-key column values exceed a predetermined length. At step 411, the sub-entry is inserted into the entry for the first-level sub-key that resides in the leaf node of the first-level tree 302.

If at step 412 it is determined that a second-level tree already exists for the first-level sub-key, then control passes to step 414. At step 414, the second-level tree is traversed based on the second-level sub-key. Thus, if the index entry to be inserted is for the key (ICE, 10), then the second-level tree 320 for the first-level sub-key "ICE" is traversed based on the second-level sub-key "10". At step 410 a sub-entry is created and at step 411 the sub-entry is inserted into the second-level tree 320.

If at step 404 it is determined that no index entry exists for the first-level sub-key, then an index entry is created for the first-level sub-key at step 406. Control then proceeds to step 416, if the insertion of the first level index entry would not exceed the predetermined threshold, then control passes to step 410, where a sub-entry is created. At step 411, the sub-entry is inserted into the new entry within the leaf node of the first-level tree. If, at step 416, the insertion of the first-level index entry exceeds the predetermined threshold, then the sub-entry is inserted in a second level sub-tree as described earlier (steps 418 through 424).

ENTRY DELETION PROCESS

When a document is removed from the collection of documents associated with an inverted index, then the index entries for that document must be removed from the index. The removal of entries may cause the number of sub-entries in a second-level tree to fall below a predetermined threshold. Under these conditions, the sub-entries stored in the second-level tree may be moved into the index entry within the leaf node of the first-level tree, and the second level tree may be deleted.

REDUCED STORAGE COSTS

A two-level index structure constructed in the manner described above potentially has reduced storage costs as compared to a conventional one-level index. Storage cost may be reduced because, for each of the nested groups, the first-level sub-key value is stored only once in the top-level index. In contrast, a sub-key value will be repeated once per index entry in a single level index organization. Prefix compression can mitigate the first-level sub-key duplication costs in a single level index organization. However, the compression is applicable only for all entries in a single leaf block. Thus, if the entries with the same first-level key value span multiple blocks, the key value needs to be repeated at least once per leaf block.

IMPROVED CONCURRENCY

A process must typically acquire a lock that prevents other processes from accessing a node of an index before the process can modify the node. Each such locks may prevent other processes from accessing the node to process other queries. When many such locks are held on nodes of a B-tree, the number of processes that can concurrently process queries using the B-tree is reduced.

Without nested data retrieval structures, the insertion of entries into a B-tree index always results in updates being made to one or more leaf nodes of the index, and possibly updates to branch nodes as a result of rebalancing operations. When nested data retrieval structures are employed as described above, many insertion operations will only require updates to the nested data retrieval structures. As the first-level tree becomes saturated, it becomes less likely an insertion will require modification of the first-level tree. Consequently, fewer locks will be acquired on the nodes of the first-level tree, and concurrency within the database system is improved.

MULTI-LEVEL INDEXES

In the foregoing discussions, embodiments of the present invention have been described with reference to two-level indexes for the purposes of explanation. However, the present invention is not limited to indexes with any particular number of levels. For example, the key of an index may be divided into five sub-keys. When the size of the group of sub-entries for a particular first-level sub-key value exceeds a predetermined threshold, a second-level tree is built for that first-level sub-key value based on the second-level sub-key. Similarly, when the size of the group of sub-entries for a particular second-level sub-key value exceeds a predetermined threshold, a third-level tree is built for that second-level sub-key value based on the third-level sub-key. This process may continue to support any number of levels.

Figure 5:
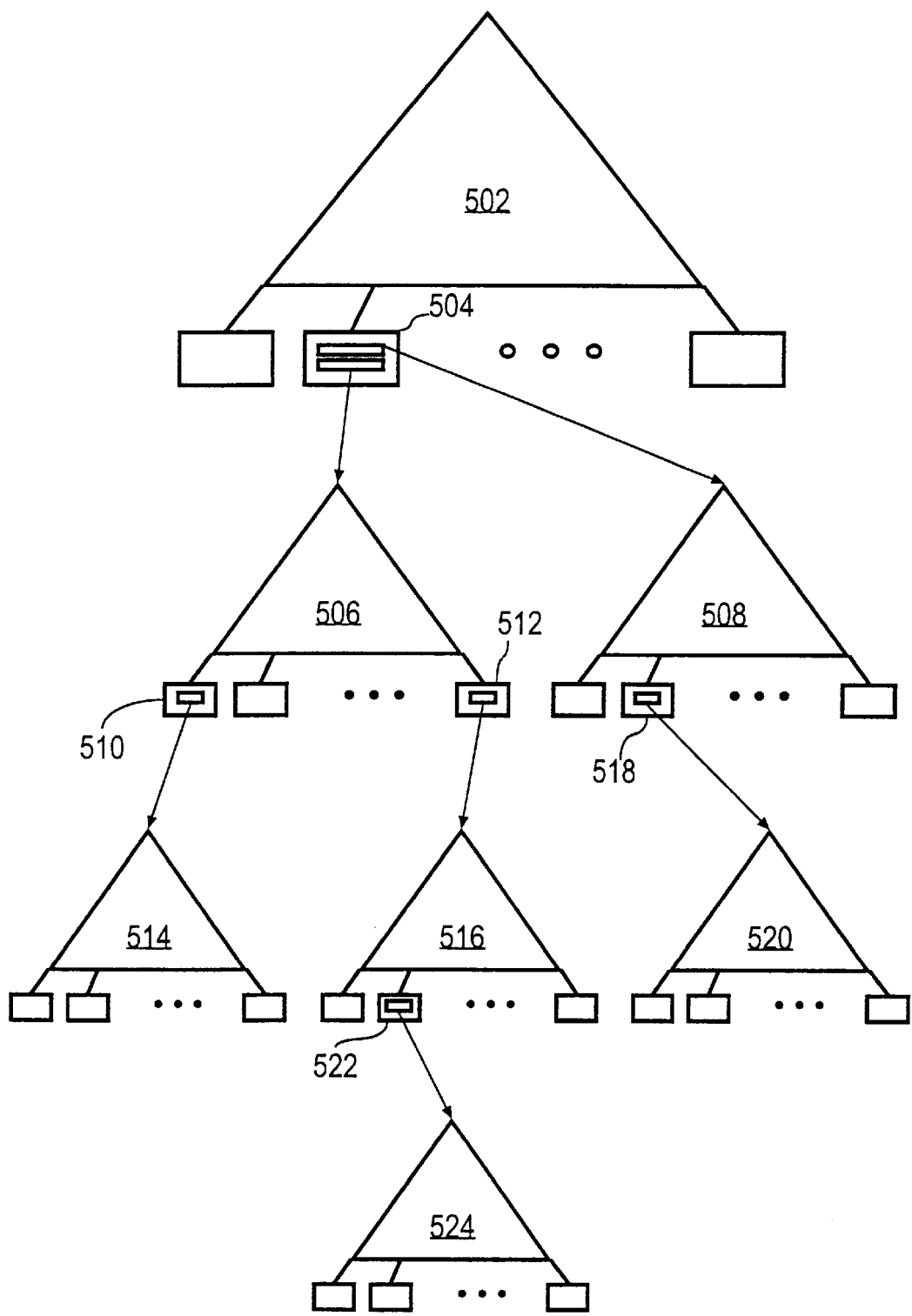
FIG. 5 is a block diagram of a four-level data retrieval structure according to an embodiment of the invention.

FIG. 5 illustrates an inverted index that has four levels. Each leaf node in the first-level tree 502 contains entries for a particular range of first-level sub-key values. The first-level tree 502 includes a leaf node 504 with entries that identify two second-level trees 506 and 508.

Each leaf node in the second level trees 506 and 508 contains entries for a particular range of second-level sub-key values associated with a particular first-level sub-key value. The second-level tree 506 has leaf nodes 510 and 512 that include entries that identify two third-level trees 514 and 516, respectively. The second-level tree 508 has a leaf node 518 that includes an entry that identifies a third-level tree 520.

Each leaf node in the third level trees 514, 516 and 520 contains entries for a particular range of third-level sub-key values associated with a particular <first-level sub-key, second-level sub-key> combination. The third level tree 516 has a leaf node 522 that includes an entry to a fourth-level tree 524. Each leaf node in the fourth-level tree 524 contains entries for a particular range of fourth-level sub-key values associated with a particular <first-level sub-key, second-level sub-key, third-level key> combination.

In the embodiments described above, a lower-level data retrieval structure is not created until the number of sub-entries in the upper-level leaf node for a given sub-key exceeds a predetermined threshold. However, alternative embodiments of the invention may never store sub-entries in the leaf nodes of the upper-level trees. In such embodiments, every upper-level index entry would have a corresponding lower-level data retrieval structure.

NON-B-TREE STRUCTURES

The embodiments described above include multiple-level B-trees. However, the present invention is not limited to any particular types of data retrieval structures. Rather, each level of the multiple-level retrieval structure may include any type or any combination of types of data retrieval structures, including B-trees, linear lists, B+trees, R-trees, and hash tables.

For example, the first-level sub-key value may be used to hash to an entry in a first-level hash table. The entry in the hash-table may contain a pointer to a second-level B-tree for the first-level sub-key value. The second-level B-tree is built on the second-level sub-key. The second-level B-tree may be traversed based on the second-level sub-key to locate a leaf node that contains the non-key column data for that particular <first-level sub-key, second-level sub-key> combination.

MULTI-LEVEL INVERTED INDEXES WITH TABLES

Figure 6:
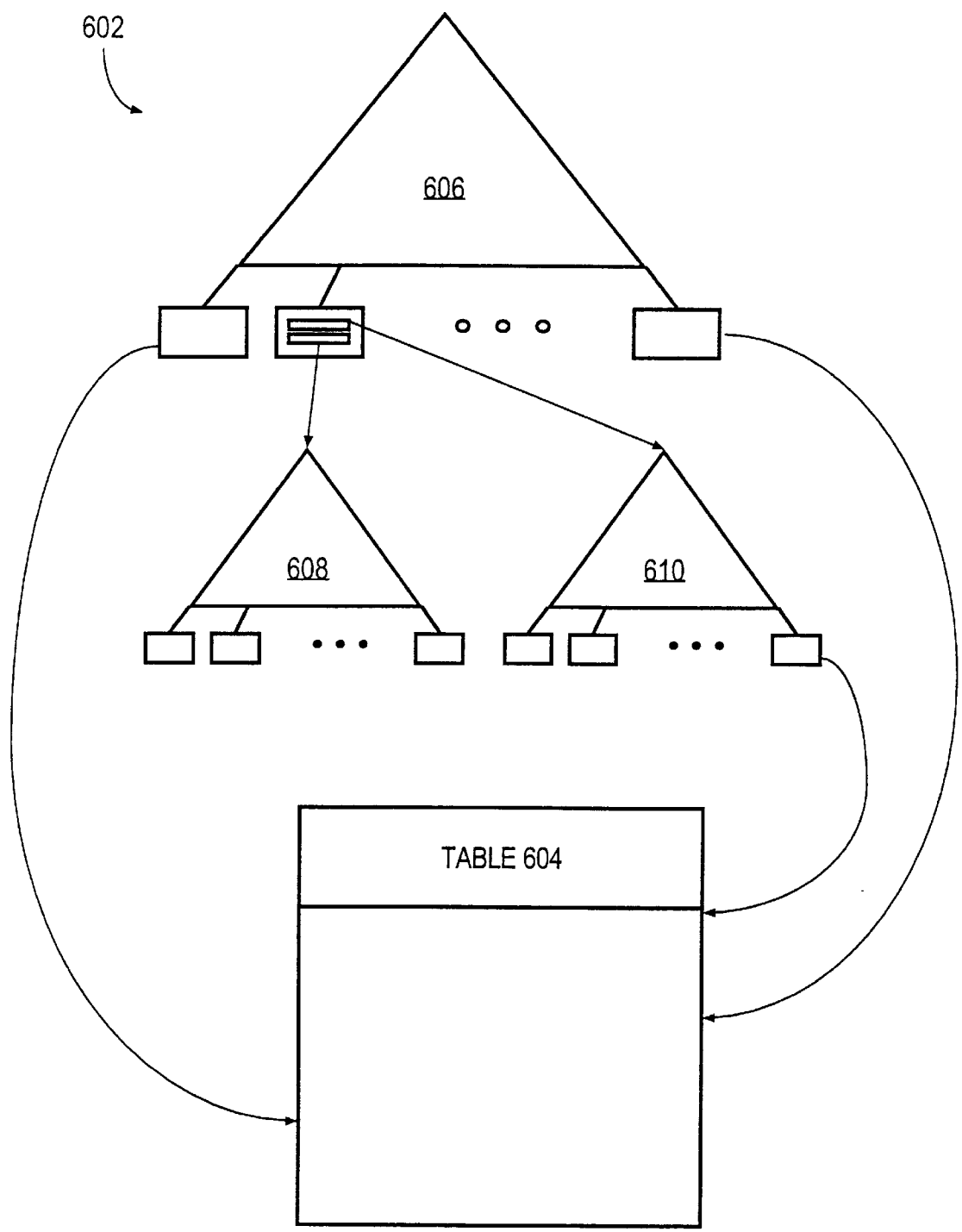
FIG. 6 is a block diagram of a two-level index plus table arrangement according to an embodiment of the invention.

While it is preferred to store the non-key column data in the sub-entries of the leaf nodes, as described above, the non-key column data may alternatively be stored in a separate table. For example, FIG. 6 illustrates an inverted index implemented using a multiple-level retrieval structure 602 in association with a table 604.

The multiple-level retrieval structure 602 includes one first-level B-tree 606 built on a first sub-key, and two second-level B-trees 608 and 610 that are built on second-level sub-keys that are associated with particular first-level sub-key values. The sub-entries in the leaf nodes of B-trees 606, 608 and 610 do not store non-key column values. Instead, the sub-entries either store pointers to a lower-level data retrieval structure, or a pointer to an entry in table 604 that contains the non-key column values associated with a particular key value.

SPATIAL DATA APPLICATIONS

In the foregoing discussion, embodiments of the invention have been described with reference to text-based information retrieval. However, the present invention is not limited to the retrieval of any particular type of information.

For example, a multiple-level data retrieval structure may be used to retrieve information about spatial data. With spatial data, three-dimensional coordinates are mapped to a one dimensional value referred to as an hhcode. The hhcode for points within the same sub-region of space have a common prefix. A multi-level index may be built on the hhcode where the prefix portion of the hhcode is used as the first-level sub-key to build a first-level data retrieval structure, and the remainder of the hhcode is used as a second-level sub-key to build second-level data retrieval structures.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for building a multiple-level index on a key, the method comprising the steps of:

dividing said key into a plurality of sub-keys;

building a first-level data retrieval structure based on a first-level sub-key of said plurality of sub-keys, said first-level data retrieval structure including an index entry associated with a particular first-level sub-key value; and building a second-level data retrieval structure for said particular first-level sub-key value, said second-level data retrieval structure being built on a second-level sub-key of said plurality of sub-keys; and establishing a link between said index entry associated with said particular first-level sub-key value and said second-level data retrieval structure.

2. The method of claim 1 wherein:

if the size of a group of second-level sub-key values associated with a first-level sub-key value is less than a predetermined threshold, then storing in said first-level data retrieval structure sub-entries that identify said second-level sub-key values that are associated with said first-level sub-key value; and if the size of the group of second-level sub-key values associated with said first-level sub-key value exceeds said predetermined threshold, then creating a second-level data retrieval structure for said first-level sub-key value based on said second-level sub-key values.

3. The method of claim 1 wherein:

the step of building a first-level data retrieval structure includes building one of a B-tree or hash table based on said first-level sub-key; and the step of building a second-level data retrieval structure includes building one of a B-tree or hash table based on said second-level sub-key.

4. The method of claim 3 wherein:

the step of building a second-level data retrieval structure includes building a second-level B-tree based on said second-level sub-key, said second-level B-tree having a plurality of leaf nodes;

the method further comprises the steps of:

linking said plurality of leaf nodes to form a leaf node chain; and establishing a link between said index entry associated with said particular first-level sub-key value and a first leaf node in said leaf node chain.

5. The method of claim 4 further comprising the steps of:

receiving a query that requests information from all index entries associated with said particular first-level sub-key value;

traversing said first-level B-tree to locate said index entry associated with said particular first-level sub-key value;

following said link from said index entry to said first leaf node in said leaf node chain; and following said leaf node chain to retrieve information from said plurality of leaf nodes.

6. The method of claim 1 wherein:

the key is a combination of a word value and a document identifier; and the step of dividing the key into a plurality of sub-keys includes establishing the word value as the first-level sub-key and the document identifier as the second level sub-key;

the step of building a first-level data retrieval structure includes building a first-level data retrieval structure based on word values contained in said key; and the step of building a second-level data retrieval structure includes building a second-level data retrieval structure based on document identifiers associated with a particular word value.

7. A method for indexing data based on a key, the method comprising the steps of:

dividing said key into a plurality of sub-keys;

building a B-tree based on a first-level sub-key of said plurality of sub-keys;

inserting an index entry into said B-tree by performing the steps of receiving a request to insert a row of data;

reading a key value from said row of data;

dividing said key value into a plurality of sub-key values, said plurality of sub-key values including a first-level sub-key value;

traversing said B-tree to locate a leaf node of said B-tree that is associated with a range that includes said first-level sub-key value;

determining whether said leaf node already contains an entry for said first-level sub-key value;

if said leaf node does not already contain an entry for said first-level sub-key value, then inserting an entry for said first-level sub-key value into said leaf node;

creating a sub-entry that contains all sub-key values other than said first-level sub-key value and all non-key column values of said row of data; and storing said sub-entry in said entry for said first-level sub-key value.

8. The method of claim 7 further comprising the steps of:

determining whether the size of sub-entries associated with said entry for said first-level sub-key value exceeds a predetermined threshold; and if the size of sub-entries associated with said entry for said first-level sub-key value exceeds a predetermined threshold, then building a second-level data retrieval structure based on a second-level sub-key of said plurality of sub-keys;

storing said sub-entries that reside in said entry for said first-level sub-key value in said second-level data retrieval structure;

removing said sub-entries from said entry for said first-level sub-key value; and storing in said entry for said first-level sub-key value a reference to said second-level data retrieval structure.

9. The method of claim 8 wherein:

the step of building a second-level data retrieval structure includes the step of building a second-level B-tree; and the step of storing in said entry for said first-level sub-key value a reference to said second-level data retrieval structure includes the step of storing in said entry for said first-level sub-key value a pointer to a root node of said second-level B-tree.

10. The method of claim 9 wherein:

the method further includes the step of linking leaf nodes of said second-level B-tree to form a leaf node chain; and the step of storing in said entry for said first-level sub-key value a reference to said second-level data retrieval structure further includes the step of storing in said entry for said first-level sub-key value a pointer to a first leaf node in said leaf node chain.

11. The method of claim 8 wherein the step of building a second-level data retrieval structure includes the step of building a second-level hash table.

12. The method of claim 8 further comprising the steps of:

receiving a query that specifies said key value;

reading said first-level sub-key value from said key value contained in said query;

traversing said B-tree based on said first-level sub-key value to locate said leaf node associated with said range that includes said first-level sub-key value;

locating said entry for said first-level sub-key value within said leaf node;

using said reference to said second-level data retrieval structure to locate said second-level data retrieval structure;

reading a second-level sub-key value from said key value contained in said query;

using said second-level sub-key value to locate said sub-entry within said second-level data retrieval structure; and reading said non-key column values from said sub-entry.

13. The method of claim 12 wherein:

said second-level data retrieval structure is a second-level B-tree; and the step of using said second-level sub-key value to locate said sub-entry within said second-level data retrieval structure includes traversing said second-level B-tree based on said second-level sub-key value.

14. The method of claim 12 wherein:

said second-level data retrieval structure is a hash table; and the step of using said second-level sub-key value to locate said sub-entry within said second-level data retrieval structure includes performing a hash function on said second-level sub-key value.

15. A computer-readable medium having stored thereon sequences of instructions for building a multiple-level index on a key, the sequences of instructions including instructions which, when executed by a processor, cause said processor to perform the steps of:

dividing said key into a plurality of sub-keys;

building a first-level data retrieval structure based on a first-level sub-key of said plurality of sub-keys, said first-level data retrieval structure including an index entry associated with a particular first-level sub-key value; and building a second-level data retrieval structure for said particular first-level sub-key value, said second-level data retrieval structure being built on a second-level sub-key of said plurality of sub-keys; and establishing a link between said index entry associated with said particular first-level sub-key value and said second-level data retrieval structure.

16. The computer-readable medium of claim 15 further including instructions for:

if a first-level sub-key value is associated with a group of second-level sub-key values whose total size is less than a predetermined threshold, then storing in said first-level data retrieval structure sub-entries that identify said second-level sub-key values that are associated with said first-level sub-key value; and if said first-level sub-key value is associated with a group of second-level sub-key values whose total size exceeds said predetermined threshold, then creating a second-level data retrieval structure for said first-level sub-key value based on said second-level sub-key values.

17. The computer-readable medium of claim 15 wherein:

the step of building a first-level data retrieval structure includes building a first-level B-tree based on said first-level sub-key; and the step of building a second-level data retrieval structure includes building one of a B-tree or a hash table based on said second-level sub-key.

18. The computer-readable medium of claim 17 wherein:

the step of building a second-level data retrieval structure includes building a second-level B-tree based on said second-level sub-key, said second-level B-tree having a plurality of leaf nodes;

the computer-readable medium further comprises instructions for performing the steps of:

linking said plurality of leaf nodes to form a leaf node chain; and establishing a link between said index entry associated with said particular first-level sub-key value and a first leaf node in said leaf node chain.

19. The computer-readable of claim 18 further comprising instructions for performing the steps of:

receiving a query that requests information from all index entries associated with said particular first-level sub-key value;

traversing said first-level B-tree to locate said index entry associated with said particular first-level sub-key value;

following said link from said index entry to said first leaf node in said leaf node chain; and following said leaf node chain to retrieve information from said plurality of leaf nodes.

20. The computer-readable medium of claim 15 wherein:

the key is a combination of a word value and a document identifier; and the step of dividing the key into a plurality of sub-keys includes establishing the word value as the first-level sub-key and the document identifier as the second level sub-key;

the step of building a first-level data retrieval structure includes building a first-level data retrieval structure based on word values contained in said key; and the step of building a second-level data retrieval structure includes building a second-level data retrieval structure based on document identifiers associated with a particular word value.

* * * * *